(12) United States Patent
Melchior

(10) Patent No.: US 8,561,404 B2
(45) Date of Patent: Oct. 22, 2013

(54) SUPERCHARGED INTERNAL COMBUSTION ENGINE

(76) Inventor: Jean Frederic Melchior, Paris (FR)

( * ) Notice: Subject to any disclaimer, the term of this patent is extended or adjusted under 35 U.S.C. 154(b) by 690 days.

(21) Appl. No.: 12/518,379

(22) PCT Filed: Dec. 11, 2007

(86) PCT No.: PCT/FR2007/002037
§ 371 (c)(1),
(2), (4) Date: Dec. 10, 2009

(87) PCT Pub. No.: WO2008/090273
PCT Pub. Date: Jul. 31, 2008

(65) Prior Publication Data
US 2010/0095940 A1    Apr. 22, 2010

(30) Foreign Application Priority Data
Dec. 11, 2006 (FR) .................. 06 10774

(51) Int. Cl.
| F02B 33/44 | (2006.01) |
| F02B 33/00 | (2006.01) |
| F02B 37/013 | (2006.01) |
| F02M 25/07 | (2006.01) |

(52) U.S. Cl.
USPC ....... 60/612; 60/605.2; 123/562; 123/568.11; 123/568.24

(58) Field of Classification Search
USPC .................. 60/612, 605.2; 123/562, 568.11, 123/568.21, 568.26, 568.15, 568.24
IPC ................. F02M 25/07; F02B 37/013
See application file for complete search history.

(56) References Cited

U.S. PATENT DOCUMENTS

| 6,116,223 A * | 9/2000 | Feucht ................. 60/605.2 |
| 6,964,270 B2 * | 11/2005 | Janssen et al. ........ 123/568.26 |
| 7,886,727 B2 * | 2/2011 | Ulrey et al. .......... 123/568.15 |
| 8,047,185 B2 * | 11/2011 | Ulrey et al. .......... 123/568.21 |
| 2006/0042247 A1 | 3/2006 | Haugen |
| 2007/0062190 A1 * | 3/2007 | Melchior .............. 60/612 |
| 2008/0022980 A1 * | 1/2008 | Melchior .............. 123/559.1 |
| 2010/0071674 A1 * | 3/2010 | Rabe et al. ........... 123/568.11 |
| 2012/0036847 A1 * | 2/2012 | Schreiber et al. ....... 60/602 |

FOREIGN PATENT DOCUMENTS

| DE | 100 62 169 A1 | 6/2002 |
| DE | 102 22 919 A1 | 12/2003 |
| EP | 0 701 048 A | 3/1996 |
| FR | 2338382 A1 * | 9/1977 |
| FR | 2891011 A1 * | 3/2007 |
| GB | 2 059 515 A | 4/1981 |
| GB | 2 353 328 A | 2/2001 |
| JP | 04 058 056 A | 2/1992 |
| WO | WO 99/31374 A | 6/1999 |
| WO | WO 2006/082302 A | 8/2006 |

OTHER PUBLICATIONS

International Search Report and Written Opinion for PCT/FR2007/002037, filed Dec. 11, 2007.

* cited by examiner

Primary Examiner — Thai Ba Trieu
(74) Attorney, Agent, or Firm — Alston & Bird LLP

(57) ABSTRACT

Turbocharger supercharged internal combustion engine, of which the exhaust manifold (22) comprises a first outlet (20) constantly supplying a turbine (18) for driving a compressor (12), a second outlet (34) equipped with means of sealing (36) synchronized with the rotation of the engine in order to supply a recycling conduit (46) of exhaust gas and a third outlet connected by a by-pass conduit (58) at the outlet of the turbine (18).

12 Claims, 3 Drawing Sheets

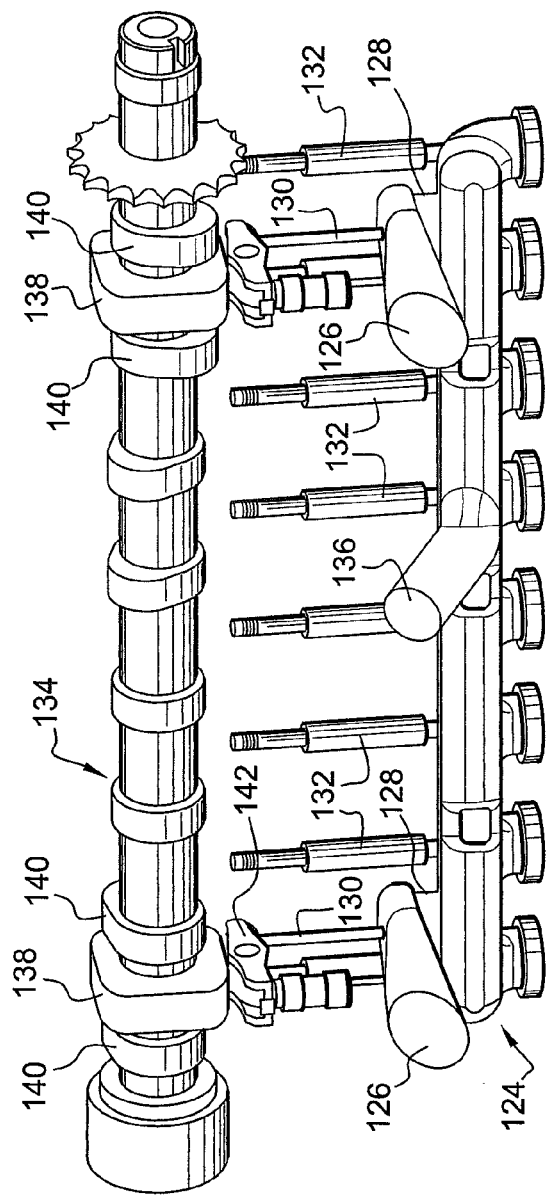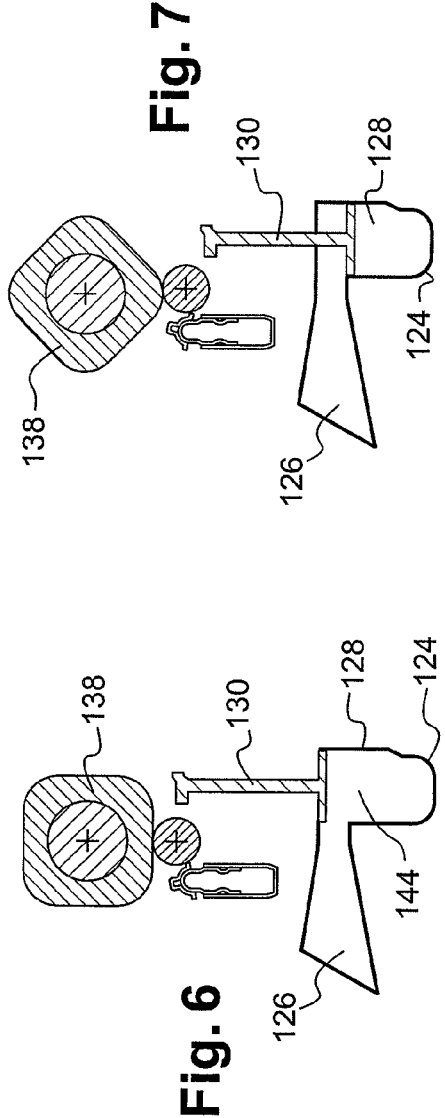

SUPERCHARGED INTERNAL COMBUSTION ENGINE

CROSS REFERENCE TO RELATED APPLICATIONS

This application is a national stage application filed under 35 U.S.C. 371 of International Application No. PCT/FR2007/002037, filed Dec. 11, 2007, which claims priority to French Application No. 06 10774, filed Dec. 11, 2006.

FIELD AND BACKGROUND OF THE INVENTION

The invention relates to a turbocharger supercharged four-stroke internal combustion engine, in particular for a vehicle, this alternating piston engine comprising an intake manifold supplied in air under pressure by a compressor driven by a turbine itself supplied by a fraction at least of the exhaust gas of the engine, another fraction of these exhaust gases able to be recycled in the intake manifold in order to reduce the emissions of nitrogen oxides NOx.

The invention relates, more particularly, to an engine of the aforementioned type with two stages of turbocompression, comprising a low-pressure compressor and a high-pressure compressor mounted in series in order to supply the engine in compressed air, and driven respectively by a high-pressure turbine and by a low-pressure turbine, which are mounted in series and supplied by the exhaust gases of the engine.

In such an engine, the high-pressure turbine is dimensioned for the low engine rotating speeds, in order to improve the turbocompression at these speeds. A by-pass conduit equipped with an adjustable valve is connected between the intake and the outlet of the high-pressure turbine and makes it possible, for the highest rotating speeds of the engine, to discharge an excess flow of exhaust gas directly to the intake of the low-pressure turbine, which is dimensioned more generously.

However, this discharge of exhaust gas at the intake of the low-pressure turbine increases the pressure between the turbines and decreases the expansion ratio and the flow of the high-pressure turbine. This also increases the expansion ratio of the low-pressure turbine. Beyond a certain by-pass rate of the exhaust gases, the power provided by the high-pressure turbine is no longer sufficient to drive the compressor associated with this turbine.

SUMMARY OF THE INVENTION

This invention has in particular for purpose to prevent this disadvantage of prior art.

It also has for purpose to reduce the pressure of the gases downstream of the engine during the exhaust phases in order to improve the output of the four-stroke engines.

It further has for purpose to increase the rate of recycled exhaust gas or to reduce the ratio of the combustion in the engine.

It proposes, to this effect, a turbocharger supercharged internal combustion engine, comprising an exhaust manifold of which an outlet is connected to the intake of a turbine driving a supply compressor of the engine in air under pressure, characterised in that the exhaust manifold comprises at least one second outlet equipped with means of sealing actuated in synchronism with the rotation of the crankshaft of the engine in order to close this second outlet during the opening of the exhaust ports of the cylinders of the engine and in order to open it before the closing of said exhaust ports.

As such, in the engine according to the invention, an initial portion of the mass of gas emitted by each cylinder supplies high-pressure to the turbine during a first fraction of the period of emptying of the cylinder, and the rest of this mass of gas is shared at low pressure between the turbine and the second outlet of the exhaust manifold.

Advantageously, the second outlet of the exhaust manifold is connected to the intake manifold of the engine by a recycling conduit of exhaust gas.

According to another characteristic of the invention, the exhaust manifold comprises a third outlet connected to the outlet of the aforementioned turbine by a by-pass conduit equipped with a flow regulator valve.

The outlet of this by-pass conduit can supply a low-pressure turbine which drives a low-pressure compressor mounted in series with the aforementioned compressor which is a high-pressure compressor, the low-pressure turbine being supplied in exhaust gas by the aforementioned turbine (which is a high-pressure turbine) and by the adjusting valve of the by-pass conduit.

A high back pressure can as such be maintained downstream of the engine when the pistons are in the neighbourhood of their bottom dead centre and return this back pressure to a level in the neighbourhood of the intake pressure during the discharge travel of the pistons. This makes it possible to supply the high-pressure turbine with pressure higher than the intake pressure without creating major losses of output by pumping during the gas transfers.

According to another characteristic of the invention, the opening of the second output port of the exhaust manifold by the aforementioned means of sealing takes place at approximately 60° of rotation of the crankshaft after the opening of the exhaust ports, and the duration of the closing of this second port is advantageously adjustable.

In these conditions, an initial portion of the mass of gas emitted by each cylinder supplies high pressure to the high-pressure turbine and adjusting valve of the by-pass conduit connected to the low-pressure turbine during the first third of the emptying of the cylinder and the rest of this mass of gas supplies low pressure, in parallel, to the high-pressure turbine, the recycling conduit of exhaust gas and the by-pass conduit connected to the low-pressure turbine, during the rest of the period of emptying of the cylinder.

As a single cylinder can be emptied by a half-turn of the crankshaft, the invention is limited to four cylinders per turbine for a four-stroke engine.

The volume of the recycling conduit must be sufficient in order to accommodate the burst of gas that follows the putting into communication with the exhaust manifold and to return a portion of it to the turbines at the end of evacuation of the cylinder.

The means of sealing of the second outlet of the exhaust manifold can include a butterfly valve or a rotating disc driven at a rotation speed that is double of that of the crankshaft of the engine (in the case of a four-cylinder four-stroke engine), which allows for very rapid opening and closing of this second outlet, or more preferably one or several valves actuated by four-lobe cams (in the case of a four-cylinder four-stroke engine) of the camshaft controlling the exhaust valves of the cylinders connected to the exhaust manifold.

In order to increase the opening speed of the exhaust ports, it is advantageous that the heads of the exhaust valves be embedded in the cylinder head of the engine in their position of closing of the exhaust ports, which makes it possible to accelerate the valves before the actual opening of the exhaust ports.

In order to provide a rapid transfer of the expansion of the exhaust gases between the exhaust ports and the critical section of the high-pressure turbine, it is advantageous that the volume of the exhaust manifold be small in relation to the unitary capacity displacement and for example less than 30% of the volume of a cylinder of the engine.

In order to reduce to a minimum the pressure downstream of the engine during the recycling of exhaust gas towards the intake manifold, which makes it possible to optimise the output of the engine, it is advantageous for the recycling conduit of the exhaust gas to be generously dimensioned and to include an adjusting valve in order to reduce the rate of recycled gas. This valve must be placed at the intake of the recycling conduit in order to reduce to a minimum the volume upstream of the turbines when it is closed.

According to an alternative embodiment of the invention, the exhaust manifold is a conduit formed of foundry inside the cylinder head of the engine and which extends along a rank of exhaust valves. This conduit comprises at each of its ends an outlet connected to a recycling conduit of the exhaust gas and equipped with a valve closing and opening its link to the recycling conduit, this valve and the exhaust valves of the cylinders connected to the exhaust manifold being controlled by the same camshaft.

This exhaust manifold also includes a first intermediate outlet connected to the intake of a high-pressure turbine. When a low-pressure turbine exists, the manifold includes a second intermediate outlet connected to the intake of this low-pressure turbine by the intermediary of an adjustable valve.

In order to adjust the highly pulsed flow of the exhaust gas by these two intermediate outlets, it is advantageous to have them flow into one or two centrifugation chambers equipped with an annular radial diffuser.

Such a centrifugation chamber associated to a radial diffuser is already described in WO 2006/082302-A1 of the applicant. It in particular makes it possible to transform the pulsed flow into a substantially constant pressure flow, intermediate between the maximum pressure and the minimum pressure for pulsing. This constant pressure flow is more favourable for the supplying of a turbine, a catalyst or a particle filter.

The outlet of the high-pressure turbine can be connected to an axial intake of the centrifugation chamber, which is moreover supplied by the exhaust manifold by the intermediary of an adjustable expansion nozzle which exits tangentially into the centrifugation chamber.

An oxidation catalyst and a particle filter, which are cylindrical with axial flow, are advantageously mounted between the outlet of the radial diffuser and the intake of the low-pressure turbine.

The invention also proposes a method of controlling the rate of recycling of exhaust gas and of the ratio of combustion in an engine of the type described hereinabove, this engine comprising an exhaust manifold of which one outlet supplies at least one turbine, of which a second outlet is selectively connected by means of sealing to a recycling conduit of exhaust gas of which the intake is equipped with an adjusting valve, and of which a third outlet is connected to the outlet of the turbine by a by-pass conduit equipped with a flow adjusting valve, this method characterised in that it consists, with the exhaust gas recycling conduit fully open, in reducing the rate of recycled exhaust gas by opening said adjusting valve and, as required, the adjusting valve being fully open, in closing the recycling conduit by means of the adjusting valve.

An opening of the adjusting valve of the by-pass conduit results effectively in an increase in the volume of air brought to the intake manifold and by a decrease in the volume of recycled exhaust gas towards the intake manifold. If this is insufficient, the closing of the adjusting valve of the recycling conduit makes it possible to further increase the flow of air provided to the engine by increasing the supply pressure of the turbines.

BRIEF DESCRIPTION OF THE DRAWINGS

The invention shall be better understood and other characteristics, details and advantages of the latter shall appear more clearly when reading the description that follows, provided by way of example in reference to the annexed drawings wherein:

FIG. 5 is a perspective schematic view of the exhaust manifold, of the exhaust valves and of their camshaft, according to the alternative in FIG. 4;

FIGS. 6 and 7 are enlarged schematic cross-sections showing the control of the recycling valves by four-lobe cams.

MORE DETAILED DESCRIPTION

Figure 1:
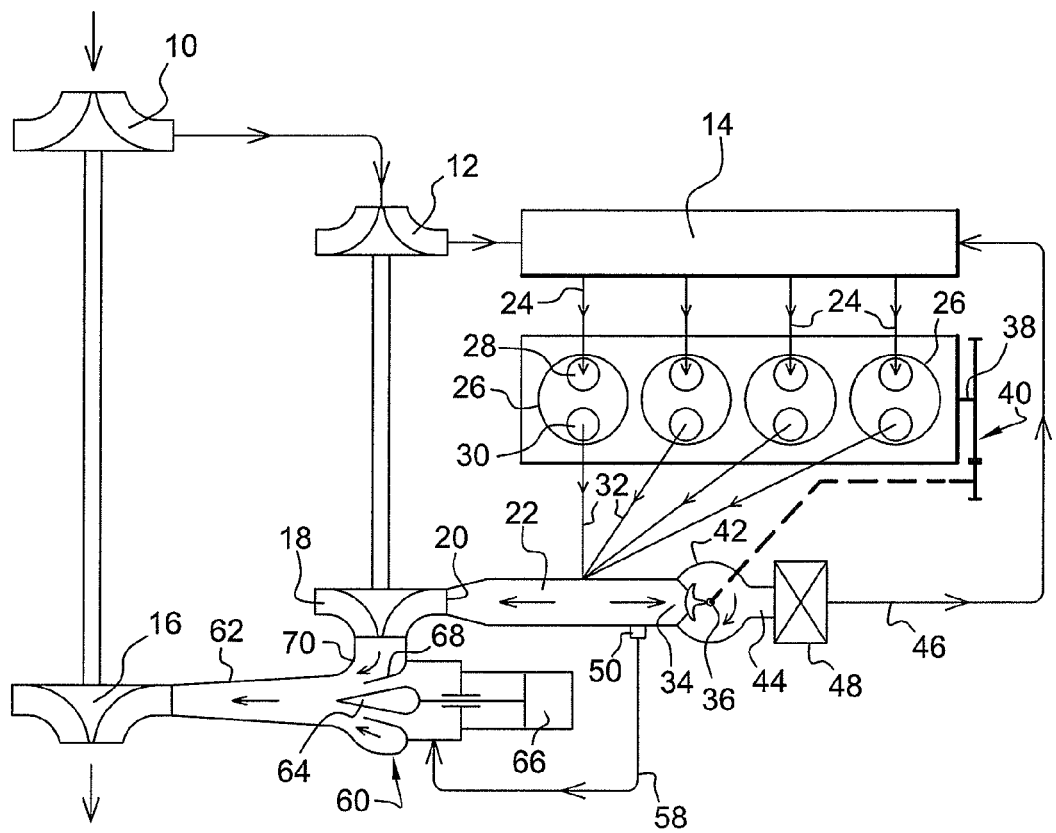
FIG. 1 schematically shows a supercharged four-cylinder engine according to the invention.

The engine shown schematically in FIG. 1 is a four-cylinder Diesel engine operating according to a four-stroke cycle substantially over a range of rotation speeds comprised between approximately 1000 and 4000 revolutions per minute, this engine being supercharged by a two-stage turbocompression by means of a low-pressure compressor 10 mounted in series with a high-pressure compressor 12 in order to supply air to an intake manifold 14 of the engine, the low-pressure compressor 10 being driven in rotation by a low-pressure turbine 16 mounted in series with a high-pressure turbine 18 which drives in rotation the high-pressure compressor 12 and which is supplied in exhaust gas by a first outlet 20 of an exhaust manifold 22.

The compressors 10 and 12 are for example centrifugal compressors and the turbines 16 and 18 are fixed geometry radial turbines.

The intake manifold 14 is connected by conduits 24 to intake ports of the cylinders 26 of the engine, these ports being equipped with intake valves 28 controlled by a camshaft, and the exhaust ports of the cylinders 26, equipped with exhaust valves 30 controlled by another camshaft, are connected by conduits 32 to the exhaust manifold 22.

This manifold comprises a second outlet 34, for example located at one end of the manifold 22 opposite the end comprising the first outlet 20, and which is selectively closed by a rotating valve 36 driven by the crankshaft 38 of the engine at a speed that is double of the rotating speed of the engine, for example by a gear drive 40.

The rotating valve 36 rotates in a cylindrical chamber 42 wherein exit, on the one hand, the second outlet 34 of the exhaust manifold 22 and, on the other hand, the intake 44 of a recycling conduit 46 of exhaust gas of which the outlet exits into the intake manifold 14.

Alternatively, the second outlet 34 of the manifold can be equipped with one or several opening and closing valves controlled by the camshaft of the exhaust valves 30, as will be seen in more detail in reference to FIGS. 5 to 7.

The intake 44 of the recycling conduit 46 comprises a flow adjusting valve 48 driven by the control system of the engine.

The exhaust manifold 22 comprises a third outlet 50 connected by a by-pass conduit 58 to an ejector 60 with an adjustable supply, mounted in the conduit 62 that connects the outlet of the high-pressure turbine 18 to the intake volute of the low-pressure turbine 16.

This ejector is advantageously of the type described in French patent application 2 891 011-A1 of the applicant and comprises an axial valve 64 in a tapered form displaceable, by an actuator 66 controlled by the control system of the engine, in a tapered convergence 68 shrinking in the downstream direction. This convergence exits axially in a nozzle 70 of converging form formed in the conduit 62 at the outlet of the high-pressure turbine 18.

The engine which has just been described operates in the following manner:

The air supplied by the compressors 10 and 12 is at a pressure of approximately 4.5 bars, the air intake temperature into the engine is approximately 300° K., with the exhaust temperature being approximately 900° K. and the total pressure in the cylinders before the opening of the exhaust valves being in these conditions equal to three times the intake pressure. The pressure in the exhaust manifold must be at least equal to the intake pressure in order to provide the recycling of a portion of exhaust gas towards the intake manifold.

For an effective expansion of the gas charge present in the cylinders at the opening of the exhaust valves 30, the second outlet 34 of the exhaust manifold 22 is closed by the valve 36 during a duration which corresponds to approximately 60° of rotation of the crankshaft 38 starting from the opening of the exhaust ports of each cylinder, i.e. a little before the bottom dead centre of each piston.

This makes it possible to send to the intake of the high-pressure turbine 18 and to the intake of the ejector 60 the first most compressed portion of the gas charge to exit the cylinder, during the first third approximately of the period of emptying of the cylinder.

In order to provide a rapid transfer of the expansion of this charge from the exhaust ports to the critical section of the high-pressure turbine 18, the volume of the exhaust manifold 22, delimited by the exhaust valves 30, the intake of the high-pressure turbine 18, the second outlet 34 of the exhaust manifold, and the ejector 60 has a minimal value that is just sufficient for a proper evacuation of each cylinder, with this value being substantially equal to 30% of the volume of a cylinder.

The transfer of the expansion of the exhaust gases to the intake of the high-pressure turbine 18 is all the more so rapid that the section feeding this turbine is low with regards to that of the exhaust ports of cylinder at full opening (it is for example less than approximately ⅓ of the section of the exhaust ports of a cylinder at full opening).

When the valve 36 opens the second outlet 34 of the exhaust manifold, the final portion of the gas charge contained in the cylinder in the process of emptying supplies, at low pressure, the high-pressure turbine 18, the recycling conduit 46 of exhaust gas and the ejector 60, during a duration corresponding approximately to the last two-thirds of the period of emptying of the cylinder.

This makes it possible to maintain a high back pressure downstream of the engine when the pistons are in the neighbourhood of their bottom dead centre and to return this back pressure to a level in the neighbourhood of the intake pressure during the discharge travel of the pistons. As such, the high-pressure turbine 18 and the low-pressure turbine 16 can be supplied with a pressure that is higher than the intake pressure without creating major losses of output by pumping during the transfers.

Figures 2, 3:
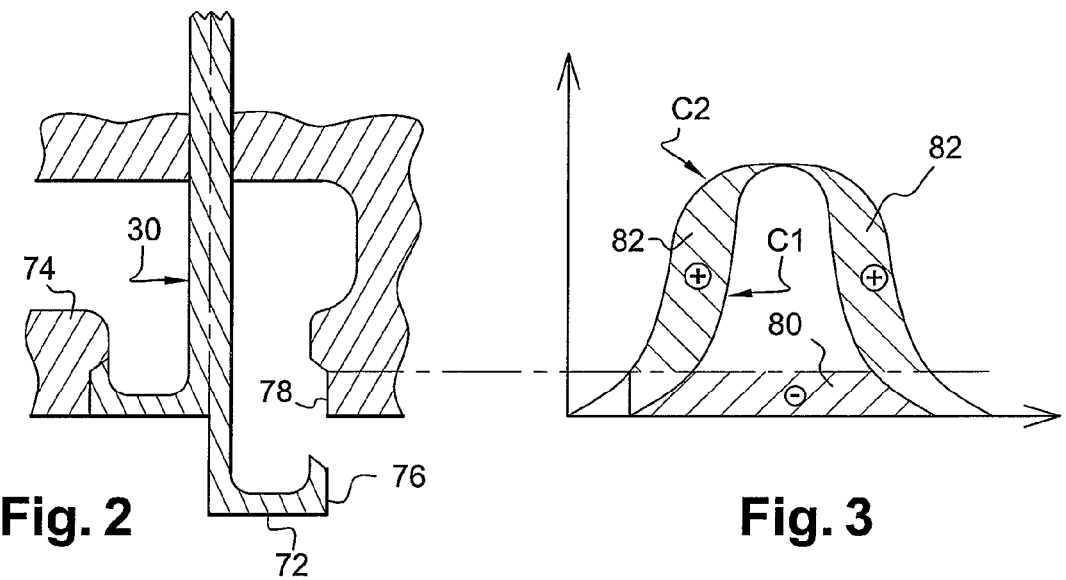
FIG. 2 is a partial schematic cross-section of an exhaust valve in its two extreme positions of closing and of opening.
FIG. 3 shows the diagrams of opening of the valve in FIG. 2 and of a conventional valve.

In order to accelerate the opening speed of the exhaust ports of the cylinders, the heads 72 of the exhaust valves 30 are, in their closing position, embedded in the cylinder head 74 of the engine, as shown in FIG. 2.

For this, a certain height is given to the peripheral edges 76 of the valve heads and in the exhaust ports are formed recesses 78 of a corresponding height, wherein these edges 76 are embedded in a tight manner in the closing position of the exhaust port.

This makes it possible to accelerate the exhaust valve over a first portion of its travel before the actual opening of the exhaust ports.

This results in a reduction of section feeding this port, which has been schematised by the hatched zone 80 of the diagram in FIG. 3, which shows the variation of this section feeding according to the rotation of the crankshaft. In this diagram, the curve C1 corresponds to the variation of this section for a valve with a head that is not embedded in the cylinder head, while curve C2 shows the variation of this section for a valve with a head embedded according to the invention, the displacement of this valve beginning a little earlier and ending a little later than that of the conventional non-embedded valve.

This results in section increases, shown by the hatched zones 82, which offset the section reduction shown by the hatched zone 80.

The rate of recycling of exhaust gas in the intake manifold 14 can reach values of 40 to 50%.

The supply of the ejector 60 by the exhaust gas with a higher pressure makes it possible to drive the flow of gas exiting from the high-pressure turbine 18 and to increase the supply pressure of the low-pressure turbine 16 without however increasing the static pressure at the outlet of the turbine 18 and without reducing the expansion ratio of this turbine.

The actuator 66 which axially displaces the valve 64 of the ejector 60 makes it possible to control the rate of recycling of the exhaust gas in the engine. Indeed, when the recycling conduit is fully open, an opening of the ejector 60 results in an increase in the volume of air supplied by the compressors 10, 12 to the intake manifold 14 and by a corresponding reduction in the volume of recycled exhaust gas in the intake manifold. If this reduction in the rate of recycling of exhaust gas is not sufficient, the valve 64 being in a fully opened position of the ejector 60, the closing of the valve 48 makes it possible to continue the increase of the flow of air through the increase of the supply pressure of the turbines.

Figure 4:
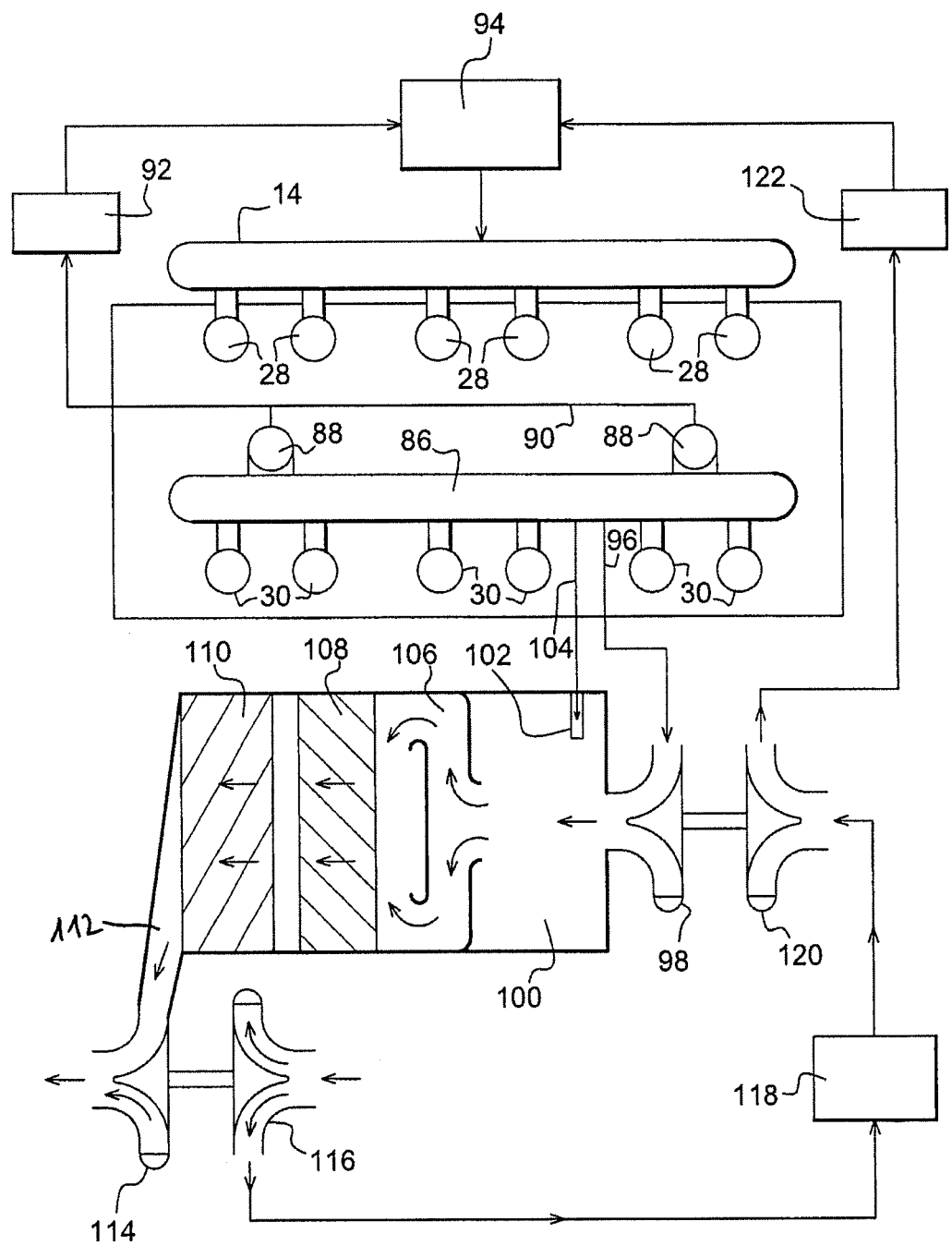
FIG. 4 is a partial schematic view of an alternative of the invention applied to a three-cylinder engine.

In the alternative embodiment in FIG. 4, the engine comprises a line of three cylinders which is equipped with a turbocompression group with two high-pressure and low-pressure turbines and two high-pressure and low-pressure compressors, respectively.

This type of three-cylinder engine per turbine is better adapted to the implementation of the invention than an engine with four cylinders per turbine, wherein the pressure wave of a cylinder intervenes just before the closing of another cylinder which undergoes a reflux of burned gas for the following cycle, which degrades the filling output.

Each cylinder of the engine in FIG. 4 is supplied by an intake manifold 14 and comprises two intake valves 28 and two exhaust valves 30. The exhaust ports of the three cylinders of the rank exit directly in an exhaust manifold 86 comprising in the neighbourhood of its ends two outlets 88 equipped with sealing valves and connected by a recycling conduit 90 of exhaust gas equipped with a cooling exchanger 92 to a mixer 94 supplying the intake manifold 14.

The exhaust manifold 86 in addition comprises an intermediate outlet 96 connected to the intake of a high-pressure turbine 98 of which the outlet supplies an axial intake of a centrifugation chamber 100 of the type described in WO 2006/082302-A1. This centrifugation chamber is of cylindrical form and comprises a tangential intake perpendicular to its axis, equipped with an adjustable converging nozzle 102 supplied by another intermediate outlet 104 of the exhaust manifold. The axial outlet of the centrifugation chamber is connected by an annular radial diffuser 106 to a cylindrical oxidation catalyst 108 with axial flow, which is followed by a particle filter 110 also cylindrical with axial flow.

The centrifugation chamber, the catalyst 108 and the particle filter 110 can be housed in the same cylindrical enclosure of which the outlet 112 supplies a low-pressure turbine 114 which drives in rotation a low-pressure compressor 116.

The outlet of the compressor 116 is connected, by a conduit equipped with a cooling exchanger 118, to the intake of a high-pressure compressor 120 driven in rotation by the high-pressure turbine 98.

The outlet of the high-pressure compressor 120 is connected, by a conduit equipped with a cooling exchanger 122, to the mixer 94 which supplies the intake manifold 14.

In this configuration, the flow of exhaust gas that supplies the centrifugation chamber 100 is highly pulsed. The pressure pulses are transformed into angular momentum in the centrifugation chamber by the expansion nozzle 102. The rotating flow is then recompressed by the radial diffuser in order to supply the catalyst, the particle filter and the low-pressure turbine by a flow at a substantially constant pressure that is higher than the static pressure at the output of the high-pressure turbine. The centrifugation chamber plays the same role as the ejector 60 described in FIG. 1.

Moreover, the disposition of the catalyst 108 and of the particle filter 110 between the high-pressure turbine and the low-pressure turbine 114 has for advantage that the temperature of the gases treated by the catalyst is higher than that present downstream of the low-pressure turbine and in that the maximal flow of the engine, the reduced volume of the gases under pressure that cross the particle filter make it possible to minimise the head loss of the latter.

Alternatively, the centrifugation chamber 100 can be located upstream of the high-pressure turbine and supply this turbine and its by-pass conduit by the intermediary of the annular radial diffuser 106, of the catalyst 108 and of the particle filter 110.

In another alternative, each intermediate outlet of the exhaust manifold is connected to a centrifugation chamber which supplies a turbine, high pressure or low pressure respectively.

The exhaust manifold 86 in FIG. 4 can be incorporated into the foundry of the cylinder head of the engine, of a single part with this cylinder head.

Such an embodiment is shown in FIG. 5 in the case of an engine with one group of four inline cylinders. In this figure, the interior volume of the exhaust manifold has been shown, for more clarity, without the cylinder head of the engine, as well as the exhaust valves with their camshaft.

The exhaust manifold 124 in FIG. 5 has a length substantially equal to that of the rank of valves and is of reduced section, its volume being minimal and less than that of a cylinder, as has already been indicated hereinabove in reference to FIG. 1.

It comprises at its ends two outputs 126 connected to the conduit 90 of recycling exhaust gas, with each one of these outlets being connected to the manifold by a boss or dome 128 wherein is mounted a valve 130 called a recycling valve in what follows, which is controlled by the same camshaft 134 as the exhaust valves 132.

The exhaust manifold 124 also comprises two intermediate outlets 136, of which a single one has been shown on the drawing, which are similar to the intermediate outlets in FIG. 4.

Each recycling valve 130 is located between the two exhaust valves 132 of a cylinder at the end of the rank and is actuated by a four-lobe cam 138 at 90° for 4 cylinders and with 3 lobes at 120° for 3 cylinders, borne by the shaft 134 between the two cams 140 controlling the exhaust valves 132 of the end cylinder. This cam 138 acts on a finger 142 mounted between a fixed point and the upper end of the recycling valve 130. The recycling valves are in a closing position during the opening of the exhaust ports and are in an opening position before the closing of the exhaust ports.

The opening and closing positions of a recycling valve are shown schematically in FIGS. 6 and 7 wherein it can be seen that the valve 130 opens and closes respectively a port 144 for communication between the dome 128 of the manifold and its outlet 126. Thanks to this disposition, it is not necessary to provide a sealing seat for the recycling valve 130, which simplifies the carrying out of the manifold and optimises the opening and closing speed of the port 144.

The two recycling valves 130 at the ends of the manifold are actuated in synchronism, in such a way that each cylinder is emptied simultaneously towards the two ends of the manifold. This makes it possible to reduce to a minimum the volume of the exhaust manifold, of which the section is determined for the flow of a single exhaust valve, i.e. half of the flow discharged by the piston of a cylinder.

This manifold can of course also equip the engine in FIG. 1, one of its intermediate outputs being connected to the intake of the high-pressure turbine and the other intermediate outlet to the by-pass conduit 58 equipped with the ejector 60.

The invention claimed is:

1. A turbocharger supercharged four-stroke internal combustion engine, comprising at least one cylinder wherein takes place a thermodynamic cycle comprising an intake phase, a compression phase, an expansion phase, and an exhaust phase, wherein the at least one cylinder includes at least one exhaust valve, a duration of the exhaust phase beginning as soon as the first of the at least one exhaust valve is opened and ending as soon as the last of the at least one exhaust valve is closed, the engine further comprising an exhaust manifold of which one outlet is connected to the intake of a turbine driving a compressor supplying the engine in air under pressure, wherein the exhaust manifold comprises at least one second outlet provided with means of sealing actuated in so as to have the second outlet closed during an initial portion of the duration of the exhaust phase of the at least one cylinder of the engine, and seas then to have the second outlet opened through the end of said duration of the exhaust phase.

2. The engine set forth in claim 1, wherein, approximately, the second outlet is closed during an initial one third of cylinder the duration of the exhaust phase of the at least one cylinder of the engine and is opened during the final two thirds of said duration of the exhaust phase.

3. The engine set forth in claim 1, wherein the means of sealing the second outlet of the exhaust manifold is a poppet valve actuated by an additional cam of the engine camshaft comprising a number of lobes equal to the number of cylinders of the engine being up to 4.

4. The engine set forth in claim 1, wherein the means of sealing the second outlet of the exhaust manifold is a rotating valve driven by the crankshaft of the engine at the engine speed for 2 cylinders and at 2 times the engine speed for 4 cylinders.

5. The engine set forth in claim 1, wherein the exhaust manifold has a volume that is less than that of a cylinder of the engine.

6. The engine set forth in claim 1, wherein the exhaust manifold has a volume that is less than 30% of the volume of a cylinder of the engine.

7. The engine according to claim 1, wherein the critical section of the aforementioned turbine is less than the total section of the exhaust ports of a cylinder when fully opened.

8. The engine set forth in claim 7, wherein the critical section of the turbine is less than approximately ⅓ of the total section of the exhaust ports of a cylinder when fully opened.

9. The engine set forth in claim 1, wherein, in the closed position of the exhaust ports, the heads of the exhaust valves are embedded in the cylinder head of the engine in order to be accelerated before the effective opening of the ports.

10. The engine according to claim 1, wherein the aforementioned turbine is a high-pressure turbine of which the outlet supplies a low-pressure turbine driving a low-pressure compressor mounted in series with the aforementioned compressor, which is a high-pressure compressor.

11. The engine according to claim 10, wherein the exhaust manifold comprises a third outlet connected to the outlet of the high-pressure turbine via an adjustable expansion nozzle in order to accelerate the high-pressure turbine outlet flow via an axial ejector.

12. The engine according to claim 1, wherein the second outlet of the exhaust manifold is connected to the intake manifold of the engine via an exhaust gas recycling conduit.

* * * * *

UNITED STATES PATENT AND TRADEMARK OFFICE
CERTIFICATE OF CORRECTION

Page 1 of 1

PATENT NO.         : 8,561,404 B2
APPLICATION NO.    : 12/518379
DATED              : October 22, 2013
INVENTOR(S)        : Melchior It is certified that error appears in the above-identified patent and that said Letters Patent is hereby corrected as shown below:

In the Claims:

Column 8,
Line 53, "sealing actuated in so as to have" should read --sealing actuated so as to have--;
Line 55, "and seas then to have" should read --and then to have--;
Line 60, "cylinder the duration of the exhaust phase" should read --the duration of the exhaust phase--.

Signed and Sealed this
Thirty-first Day of December, 2013

Margaret A. Focarino
*Commissioner for Patents of the United States Patent and Trademark Office*